Dec. 13, 1960

V. E. CARSTEDT ET AL 2,964,717

D.C. TO A.C. CONVERTER

Filed March 20, 1959

VOLNEY E. CARSTEDT
RICHARD H. WOOD
INVENTORS

BY *Lyon & Lyon*

ATTORNEYS

United States Patent Office

2,964,717
Patented Dec. 13, 1960

2,964,717

D.C. TO A.C. CONVERTER

Volney E. Carstedt, 7802 E. 8th St., Downey, Calif., and Richard H. Wood, 5126 E. 1st St., Long Beach, Calif.

Filed Mar. 20, 1959, Ser. No. 800,709

4 Claims. (Cl. 331—113)

This invention relates to oscillators employed for converting direct current to alternating current, and, more particularly, to an improved oscillator circuit.

One of the difficulties present when an oscillator is employed for the purpose of converting direct current to alternating current is that the frequency of oscillation, as well as the output wave shape, varies with the variation in amplitude of the direct-current voltage. As a result, alternating-current apparatus which is operated by the output of the oscillator gives poor as well as unreliable performance.

It is an object of this invention to provide an oscillator which provides a stable output frequency of oscillation, despite variations in input direct-current voltage.

Another object of the present invention is the provision of a novel transistor oscillator circuit.

Still another object of the present invention is the provision of an inexpensive oscillator circuit which provides a stable frequency output with excellent wave shape characteristics despite wide variations in the input direct-current voltage and the output load impedance.

These and other objects of the invention are achieved in an arrangement wherein two transistors have their collectors connected together to form one voltage input terminal to the arrangement; the other input terminal to the arrangement is the center tap of a transformer winding, on either side of which there is connected the emitters of the two transistors. The bases of the two transistors are coupled through resistors to the transformer winding on either side of the emitters. The ends of the transformer winding are connected to the primary of a feedback transformer. The ends of the secondary of this feedback transformer are connected to the two bases of the two transistors. The feedback transformer is either made of material to have linear characteristics or operated in a manner to provide linear performance with the currents to be handled.

Application of direct-current voltage to the input terminals causes the system to oscillate. The two transistors alternately become conductive and nonconductive, enabling an output voltage to be obtained from the transformer winding which is stable at a frequency determined by the inductance and resistance of the feedback transformer secondary. The output voltage wave shape is rectangular. The operation of the system in response to an input direct-current voltage is such that the transformer winding as the result of current flowing therethrough tends to maintain the transistor conducting. However, the voltage fed back by the transformer winding is in a direction to oppose this conducting bias and when it exceeds it the one of the transistors which is conducting is rendered nonconductive. As a result, there is induced a voltage in the transformer which turns on the other transistor. This transistor will continue conductive in similar manner as the first transistor until the fed back voltage assumes sufficiently large proportions to cut it off.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
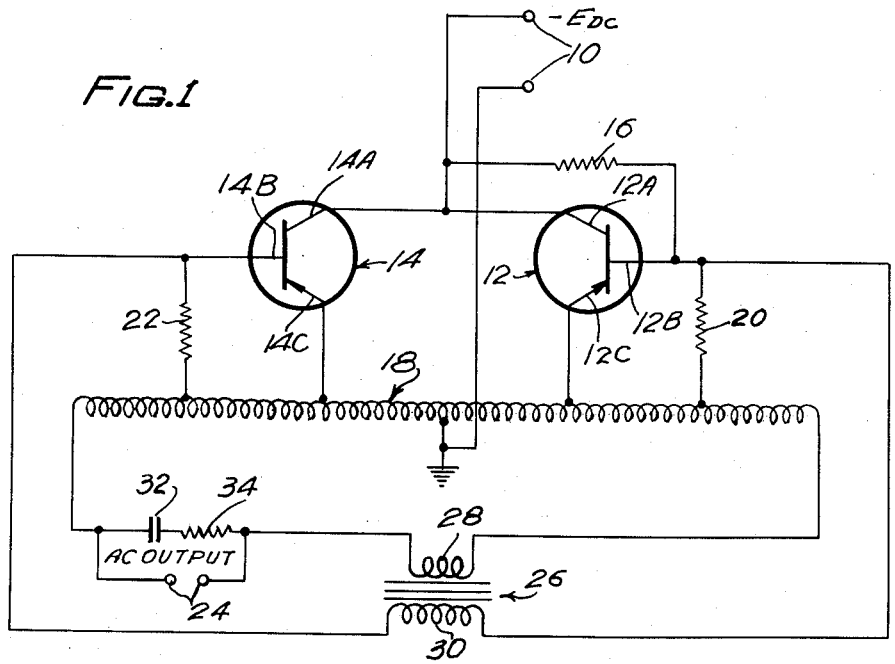
Figure 1 is a circuit diagram of one embodiment of the invention.

Reference is now made to Figure 1, which shows a circuit diagram of an embodiment of the invention. This includes a pair of input terminals 10, to which direct-current voltage to be converted is applied. A pair of transistors 12, 14 have their collectors 12A, 14A connected to one of the input terminals 10. The base 12B of transistor 12 is connected through a starting resistor 16 to the collectors. A transformer winding 18 has its center connected to the other of the input terminals 10. The base 12B of transistor 12 is connected through a resistor 20 at a point nearer the one end of the transformer winding than the point to which the emitter 12C is connected to the transformer winding. On the other side of the center tap of the transformer winding, the base 14B of transistor 14 is connected through a resistor 22 to a point on the transformer winding which is nearer to the other end thereof than the point to which the emitter 14C is connected.

The points of connection of the emitters and the resistors coupled to the respective bases of the transistors on the transformer winding are not critical. However, the emitter connection should be far enough from the center tap so that a desired emitter-biasing voltage may be developed in the operation of the system and the distance between the emitter and base center tap should be far enough to provide the required difference potential between emitter and base to enable the transistor to conduct. One of a pair of output terminals 24 is connected to one end of the transformer winding; the other of the pair of output terminals is connected to the other end of the transformer winding through the primary 28 of a feedback transformer 26. The secondary winding of this feedback transformer is connected to the respective bases 12B, 14B of the two transistors. A despiking network, consisting of a condenser 32 in series with a resistor 34, may be connected across the output terminals 24, if desired. The transformer 26 is selected to provide a linearly varying output, with variations in the input over the operating range for the circuit.

The operation of the circuit will now be described. First, disregarding the presence of the feedback transformer 26 and its connections, the arrangement shown is basically that for a free-running, common collector oscillator, which uses a small feedback voltage through the resistor 16 to insure starting. When a voltage is applied to the terminals 10 in a manner so that the terminal connected to the common collectors is more negative, transistor 12 will be initially triggered into conduction. This occurs by reason of the fact that a current flow occurs through the portion of the winding of the transformer connected to emitter 12C and through resistor 20 and resistor 16. Thereby, the base is made slightly negative with respect to the emitter. Current flowing through the transformer winding causes an operation in accordance with autotransformer principles, and by autoinduction the potential between emitter and base is increased, causing the transistor to conduct still more heavily. This draws still more current through the transformer winding. The effect is a cumulative one, as a result of which the transition from nonconduction to full conduction of the transistor is quite rapid.

The transistor will remain in conduction until the magnetic flux in the transformer winding builds up to saturation, at which time the base-drive voltage goes to zero and turns the conducting transistor off. When the conducting transistor is turned off by the saturation of the core, the collapsing flux in the transformer winding induces a reverse current through the transformer winding, as a result of which the transistor 14 is rendered conductive. This again applies the input potential through the transistor across the transformer winding until, upon saturation of the transformer winding core, the conducting transistor 14 is turned off, whereby the transistor 12 can then be turned on again.

By employing feedback in the manner shown, including the transformer 26, the inductance of which is made linear, the frequency of oscillation of the free-running oscillator is controlled in accordance with the values of the inductance and resistance of the transformer secondary. This operates to cause the conducting transistor to become cut off before the transformer winding core saturates. The current flowing through the transformer winding as a result of the primary winding 28 being in series therewith, also flows through the primary winding. This induces current in the secondary winding and the winding sense is such as to cause the current to oppose that flowing through either resistor 20 or resistor 22, as the case may be. In this manner, a bias voltage is developed across the resistor at the base, which bucks out the drive voltage applied through the transformer winding. Thus, the conducting transistor is rendered nonconducting because of the feedback sooner than it would be independently of the feedback.

Obviously, the greater the current flow through the transformer winding as a result of a rise in the applied direct-current voltage, the greater the feedback voltage to compensate for this. As a result of a drop in the applied direct-current voltage, the feedback voltage is correspondingly reduced. Thus, the feedback acts to regulate and maintain constant the cutoff of the respective transistors 12, 14; thereby the frequency of operation is maintained substantially independent of the amplitude of the input voltage.

It should be noted that even though the transistor is turned off at the time the feedback voltage bucks out the base drive voltage, the current in the secondary of the linear transformer keeps flowing for a short period of time before reversing. This serves to further assure rectangularity on the trailing edge of the output voltage waveform. The spike-removing components, consisting of the condenser 32 and resistor 34 bridged across the output terminals, are more for offsetting the effects of the load than that of the oscillator and may be omitted when a resistive load is being driven. It should further be noted that a load which has substantially zero impedance causes the oscillations to stop, and therefore the circuit effectively is protected against overload.

Figure 2:
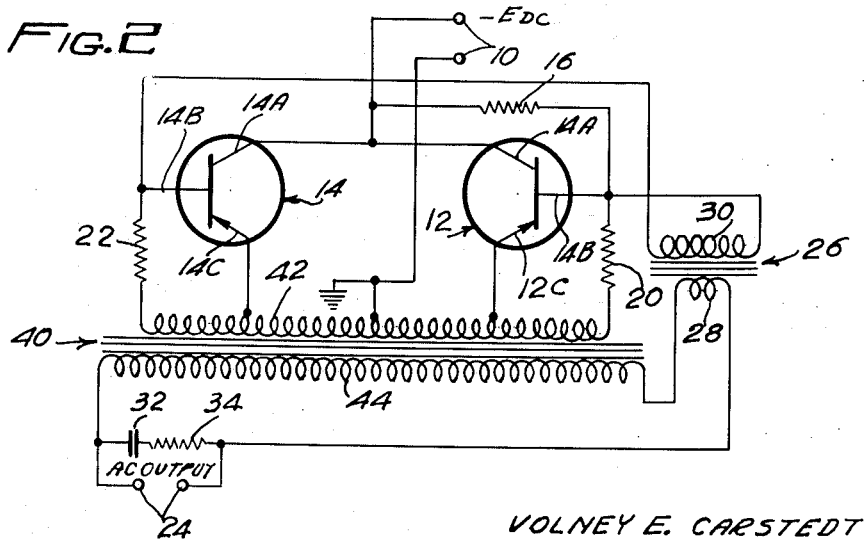
Figure 2 is a circuit diagram of a second embodiment of the invention.

Reference is now made to Figure 2, which shows another embodiment of the invention. Components in Figure 2 which have a similar function to those shown in Figure 1 are identified with similar reference numerals. The circuit shown in Figure 2 is for an arrangement wherein it is desired to completely isolate the alternating-current load from the direct-current portion of the circuit. The arrangement operates with the same success as the arrangement shown in Figure 1, to provide rectangular wave shape output at a constant frequency, despite variations in either input voltage or load. The basic transistor configuration is identical; however, in place of the transformer winding 18, there is provided a transformer 40 having a primary winding 42 and a secondary winding 44. The connections of the emitters 12C and 14C to the primary winding are made in identical fashion as they were made to the autotransformer winding shown in Figure 1. The connections of the transistor bases 12B, 14B through base load resistors 20 and 22 are made to the primary winding in substantially the same fashion as these connections were made to the autotransformer winding in Figure 1.

The operation explained above is identical for Figure 2, except that there is induced in the secondary winding 44 an alternating-current voltage which is applied across the output terminals 24. The secondary winding is connected in series with the primary 28 of the linear feed back transformer 26. The secondary winding of the linear feedback transformer is connected to the two transistor bases in identical fashion as shown in Figure 1. With this circuit, the output load is isolated from the input. It should be noted that either the configuration of Figure 1 or Figure 2 may be synchronized and locked at any desired frequency by supplying a synchronizing signal across the secondary winding of the feedback transformer, whereby the frequency is maintained constant and locked to an external frequency source. The output waveform may be made sinusoidal by providing the capacitor having the proper value to resonate with the secondary of the feedback transformer.

There has accordingly been described and shown herein a novel, useful, stable, and inexpensive oscillator, suitable for use for converting direct current to alternating current. In an embodiment of the invention which was built, the frequency of oscillation was maintained to 0.1 percent or less of a fixed frequency over a range which varied as great as 500 percent in input direct-current voltage amplitude and in output load peaks.

We claim:

1. An oscillator comprising a first and second transistor each having a collector, emitter and base element, a transformer winding having a center tap, means for connecting the emitter of each of said transistors to said transformer winding on either side of said center tap and spaced therefrom, means for coupling the base of each of said transistors to said transformer winding on either side of said center tap and spaced from the points of connection of said emitters, means for applying an operating potential between said transformer center tap and the collector elements of said transistors, and means for applying a feedback voltage from said transformer to the base elements of said transistors including a linear transformer having a primary and secondary winding, means coupling said primary winding to said transformer winding to derive an output therefrom, and means coupling said secondary winding to the base elements of both said transistors.

2. An oscillator as recited in claim 1 wherein said means coupling said primary winding to said transformer winding to derive an output therefrom includes an output winding inductively coupled to said transformer winding, and means connecting said primary winding to said output winding.

3. An oscillator comprising a first and second transistor each having a collector, emitter and base element, a transformer winding having a center tap, means connecting the emitter of each of said transistors to said transformer winding on either side of said center tap and spaced therefrom, a pair of resistors, each of said resistors being connected between one of said base elements and said transformer winding at locations spaced from the connection of said emitter elements, a linear transformer having a primary winding and a secondary winding, said primary winding being connected to said transformer winding, said secondary winding having its ends connected to the respective base elements of said transistors, a starting resistor connected between the base and collector elements of one of said transistors, and means for applying operating potential to both said collector elements and said transformer winding center tap.

4. An oscillator comprising a first and second transistor each having a collector, emitter and base element, a first transformer having a center tapped primary winding and a secondary winding, means connecting the emitter elements of said transistor to said primary winding on either side of said primary winding center tap and spaced therefrom, a pair of resistors, each of said resistors being connected between one of said base elements and said primary winding at locations spaced away from the connections of said emitter elements, a linear transformer having a primary winding and a secondary winding, means connecting said linear transformer primary winding to said first transformer secondary winding, means connecting each end of said linear transformer secondary winding respectively to the base elements of said transistors, and means for applying operating potential to the collector elements of said transistors and to the center tap of said primary winding.

References Cited in the file of this patent

UNITED STATES PATENTS

| | | |
|---|---|---|
| 2,698,386 | Eberhard et al. | Dec. 28, 1954 |
| 2,837,651 | Schultz | June 3, 1958 |